Oct. 25, 1966 T. RUSZ 3,281,595

APPARATUS AND METHOD FOR MONITORING THE QUANTITY OF A CONSTITUENT OF A GAS STREAM

Filed Nov. 14, 1963 5 Sheets-Sheet 1

TIBOR RUSZ
INVENTOR.

BY Karl F. Ross
AGENT

Oct. 25, 1966  T. RUSZ  3,281,595
APPARATUS AND METHOD FOR MONITORING THE QUANTITY
OF A CONSTITUENT OF A GAS STREAM
Filed Nov. 14, 1963  5 Sheets-Sheet 2

TIBOR RUSZ
INVENTOR.

BY
Karl F. Ross
AGENT

Oct. 25, 1966 T. RUSZ 3,281,595
APPARATUS AND METHOD FOR MONITORING THE QUANTITY
OF A CONSTITUENT OF A GAS STREAM
Filed Nov. 14, 1963 5 Sheets-Sheet 3

TIBOR RUSZ
INVENTOR.

BY

AGENT

TIBOR RUSZ
*INVENTOR.*

BY

Karl F. Ross

AGENT

Oct. 25, 1966  T. RUSZ  3,281,595
APPARATUS AND METHOD FOR MONITORING THE QUANTITY
OF A CONSTITUENT OF A GAS STREAM
Filed Nov. 14, 1963  5 Sheets-Sheet 5

TIBOR RUSZ
INVENTOR.

BY Karl F. Ross

AGENT

United States Patent Office 3,281,595
Patented Oct. 25, 1966

1

3,281,595

APPARATUS AND METHOD FOR MONITORING THE QUANTITY OF A CONSTITUENT OF A GAS STREAM

Tibor Rusz, Pittsfield, Mass., assignor of one-third to Louis M. Friedman, New York, N.Y., and one-third to Steven Szekely, Brooklyn, N.Y.

Filed Nov. 14, 1963, Ser. No. 323,693
6 Claims. (Cl. 250—43.5)

The present invention relates to an apparatus for the analysis of gaseous fluids and to improved methods of analyzing such fluids as well as to improvements in the administration of anaesthesia so administered.

In my copending application Ser. No. 270,083, filed April 2, 1963, now Patent No. 3,251,361, there is disclosed a method of and an apparatus for controlling the proportion of the vapor in a gas stream, a system having particular importance when applied to the hospital or nonhospital administration of anaesthesia. Under the principles disclosed in this application a gas stream, to be fed to a station adapted to deplete a constituent therefrom, passes in intimate relationship with the liquefied constituent at a temperature at which the gas stream is saturated with that constituent in the predetermined proportion desired in the effluent stream. The latter can then be raised to any desirable temperature out of intimate relationship with the liquid and will be found to contain only the predetermined proportion since, in spite of the fact that the saturation level of the gas stream by the liquid has been raised, no additional quantities of the constituent are available for introduction into the gas stream. By this method it has become possible to control precisely the proportion of anaesthesia administered to a patient without undue reliance upon flow-control devices for metering the anaesthetic into the gas stream.

In spite of the fact that it has now become possible to eliminate substantially entirely the use of metering valves for the addition of an anaesthetic to a gas stream, it is, nevertheless, desirable that the anaesthetist be able to continuously or substantially continuously monitor the quantity and/or concentration of the anaesthetic supplied to the patient and retained by him. Under certain circumstances, for example, a patient may release a greater quantity of anaesthetic than is administered to him. For this reason it is also important that the anaesthetist be able to monitor the exhalation and, when necessary, determine from the concentration of administered anaesthetic and the concentration of anaesthetic in the exhaled stream the quantity retained by the patient. At the present time there is no rapid, effective and convenient way of monitoring the administration of anaesthesia to a patient which takes into consideration all of the problems noted above and, especially, is able to provide an indication of the quantity retained. It should be noted that, while the present invention is directed to the solution of problems which present themselves particularly in the administration of anaesthesia, the patient serves as a station at which a particular gaseous constituent is removed from or added to a gas stream passing through this station. It follows, therefore, that the instant invention is significant in that it is applicable to other situations in which it is desirable to be able to monitor the concentration of a particular constituent or group of constituents in a gas stream supplied to the station and passing from the latter.

It is, therefore, the principal object of the present invention to provide an apparatus for the monitoring of the concentration of one or more constituents in a gas stream passed through a station at which the concentration may be changed.

2

A corollary object of the invention is to provide an improved method of monitoring the administration of anaesthesia to a patient wherein disadvantages inherent in earlier systems are reduced if not entirely eliminated.

Still another object of the invention is to provide a differential gas analyzer suitable for use in the monitoring of an anaesthetic.

The above and other objects, which will become apparent hereinafter, are attained in accordance with this invention, by providing a gas-analyzing device having a pair of detection cells interposed between the source of electromagnetic radiation and respective detectors therefor, sensitive to the intensity of the radiation passed through the cells. The system further comprises conduit means for passing all or part of the fluid stream, fed to a station at which the concentration of a particular constituent in the gas stream is altered, to one of the cells and all or part of the gas stream emanating from this station into the other cell. The output from the intensity-responsive devices is differentially connected across a readout means so as to provide a direct indication of the change in concentration of the constituent, to which the electromagnetic beams are sensitive, effected at this station.

According to a further feature of this invention, the conduit means is provided with valve means adapted to direct one or both of the inputs to the analyzer (i.e. the ingoing and outgoing gases) to one of the sampling cells and a reference gas such as atmospheric air to the other cell. With proper calibration it is thus possible to obtain a direct indication of the absolute concentration of the gas in either of the cells.

I have found that a system of this type can make use of amplifier means responsive to the differentially connected outputs of the sensing devices and yet be readily adaptable for measurement of the absolute concentration of either the ingoing or the outgoing gases when the valve means for selectively connecting the sampling cells with the incoming and outgoing conduits and either of these conduits and the source of atmospheric air, is provided with switch means for effectively changing the read-out scale so as to automatically compensate for the functional alteration in the cell arrangement. For most anaesthetic purposes the gas analyzer of the instant invention will make use of the electromagnetic radiation in the ultraviolet range so that a single ultraviolet tube will be disposed between a pair of sampling cells whose windows, open to the tube, are transparent to radiation in the ultraviolet range. It has been found that systems of this type require frequent calibration as a consequence of a change of intensity of the output of the ultraviolet tube. Consequently, it is a more specific feature of this invention to provide photoelectric means responsive to the intensity of radiation from the ultraviolet tube for altering the parameters of the current supplied to the tube in such manner as to maintain a constant output intensity.

In any event, it is desirable to provide the analyzer with calibration means for enabling resetting of the readout system when necessary and ensure that the device gives a true indication of the absolute and differential gas concentrations. While it is known to interpose a screen having a known coefficient of absorption in the ultraviolet range between the source and a photoelectric sensing device so as to permit balancing of a read-out system at a constant value and thereby to calibrate a gas analyzer, I have found that, operating with two sensing cells, it is desirable to couple this screen with the aforementioned valve means so that the screen is positioned in place for calibration when atmospheric air is passed through the respective cell. Advantageously, the coupling between the screen and the valve means is mechanical, the switch means operated by the valve means being simultaneously actuated to prepare the circuit for calibraion.

The above and other objects, features and advantages of the present invention will become more readily apparent from the following description, reference being made to the accompanying drawing in which.

Figure 6:
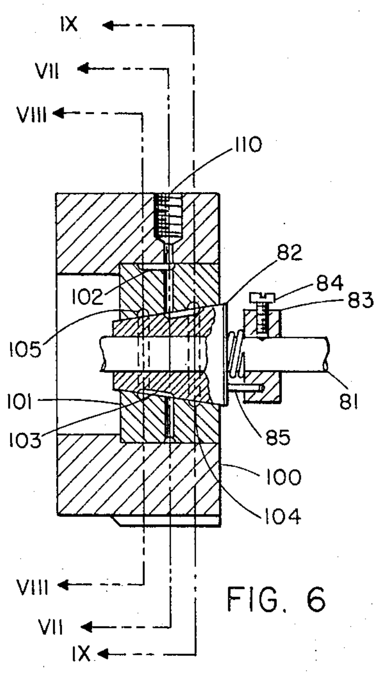
FIG. 6 is an axial cross-sectional view taken along the line VI—VI of FIG. 3 showing the distributing valve in greater detail.
Figure 7:
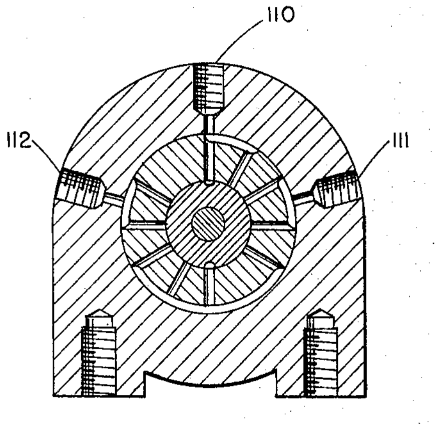
Figure 8:
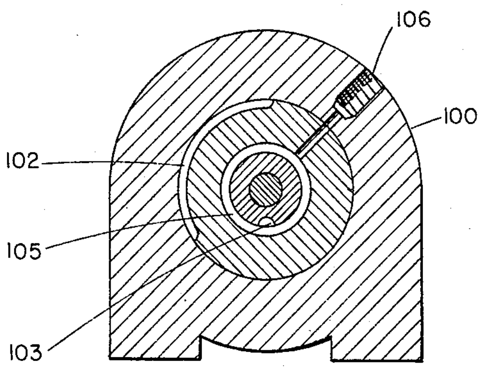
Figure 9:
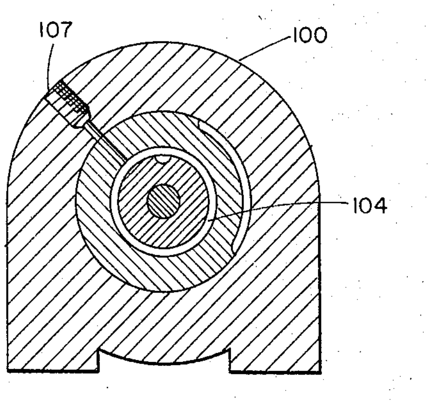
Figure 10:
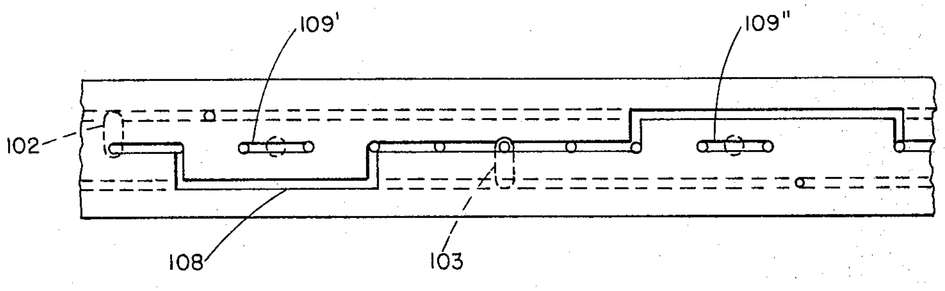
Figure 11:
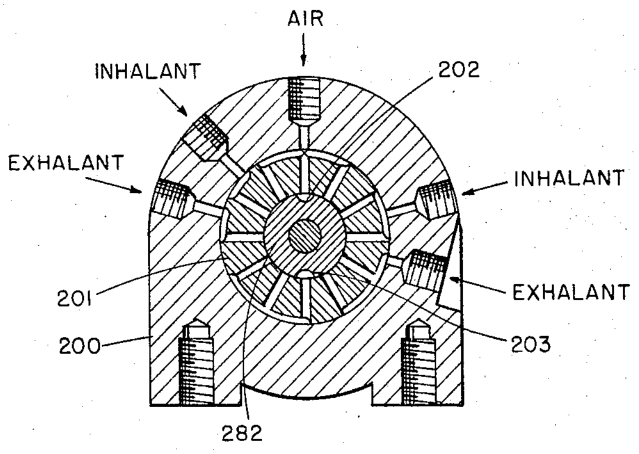
Figure 12:
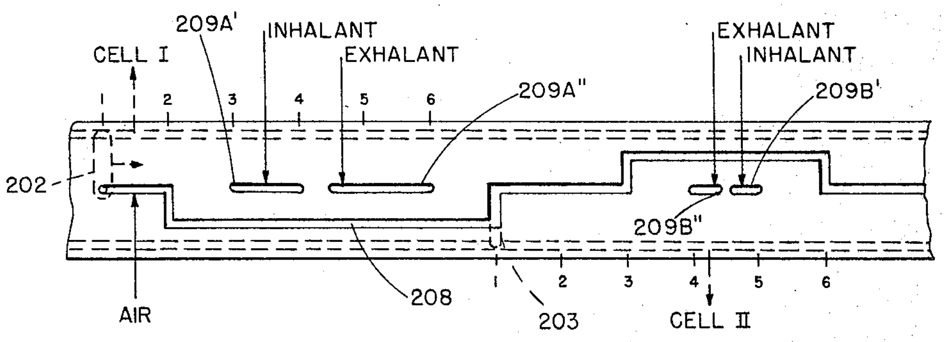

FIGS. 7, 8, and 9 are cross-sectional views taken along lines VII—VII, VIII—VIII and IX—IX respectively, of FIG. 6;

FIG. 10 is a diagrammatic, developed view of the valve illustrating the successive modes thereof;

FIG. 11 is a cross-sectional view similar to FIG. 7 of a modified valve arrangement; and FIG. 12 is a view similar to FIG. 10 illustrating the successive modes of this modification.

Figure 1:
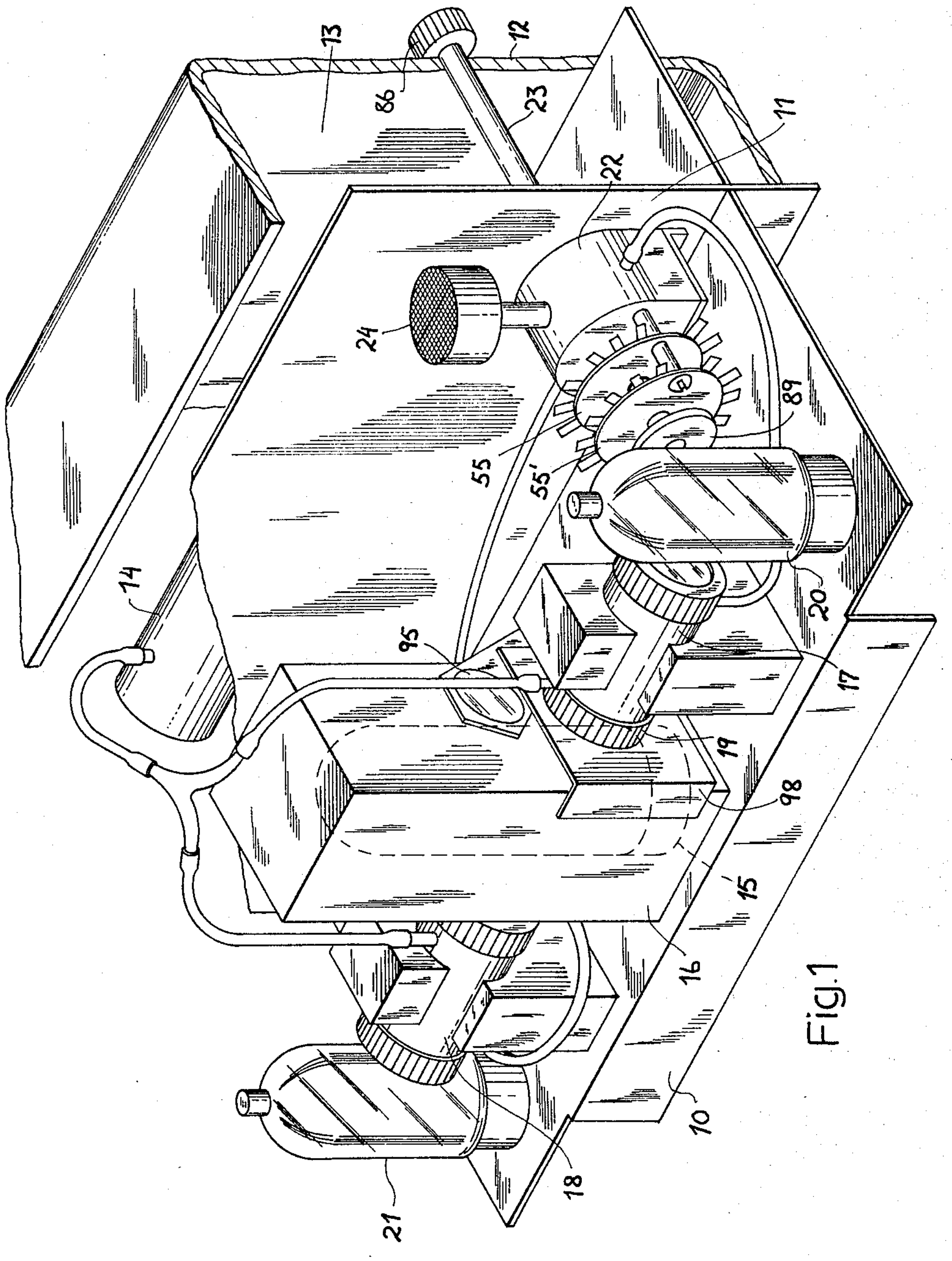
FIG. 1 is a perspective view showing a gas analyzer, according to the invention, suitable for use in hospitals and the like, for ultraviolet-radiation-absorptive gases such as halothane.

FIG. 1 shows a gas analyzer comprising a base or chassis 10 having an upright support and shield plate 11 mounted thereon. A front panel 12 is disposed forwardly of plate 11 and forms a compartment 13 therewith in which the suction pump 14, along which the necessary indicating meter, pilot lamps, switches and transformers are housed. The chassis 10 also carries an ultraviolet lamp 15, which may be of the mercury-vapor type having a principal emission at a wave length shorter than 2600 A., but preferably longer than 2000 A. The ultraviolet-ray source is received within a shield or casing 16 and is sandwiched between a pair of sampling cells 17 and 18 formed with windows transparent to ultraviolet radiation in the usual manner. If desired, cells 17, 18 can also be provided with a removable filter 19 transparent to, for example, a band of ultraviolet radiation between, say, 2475 A. and 2600 A. when halothane is to be analyzed. Advantageously, the filter passes light of about 2537 A. so that an emission substantially in the center of the halothane UV-absorption range is provided. A pair of photocells 20, 21 is provided for the measurement of the intensity of the light passing through each cell. A valve 22 has an actuating shaft 23 extending through panel 12 so that a gas to be analyzed may be fed into either of the two cells or to both of them simultaneously, air being drawn into an unused cell via a dust filter 24 by means of pump 14. Flow-indicating devices for the gas stream supplied to either or both of the sample chambers 17, 18 may be mounted upon the panel in a conventional manner.

Figure 2:
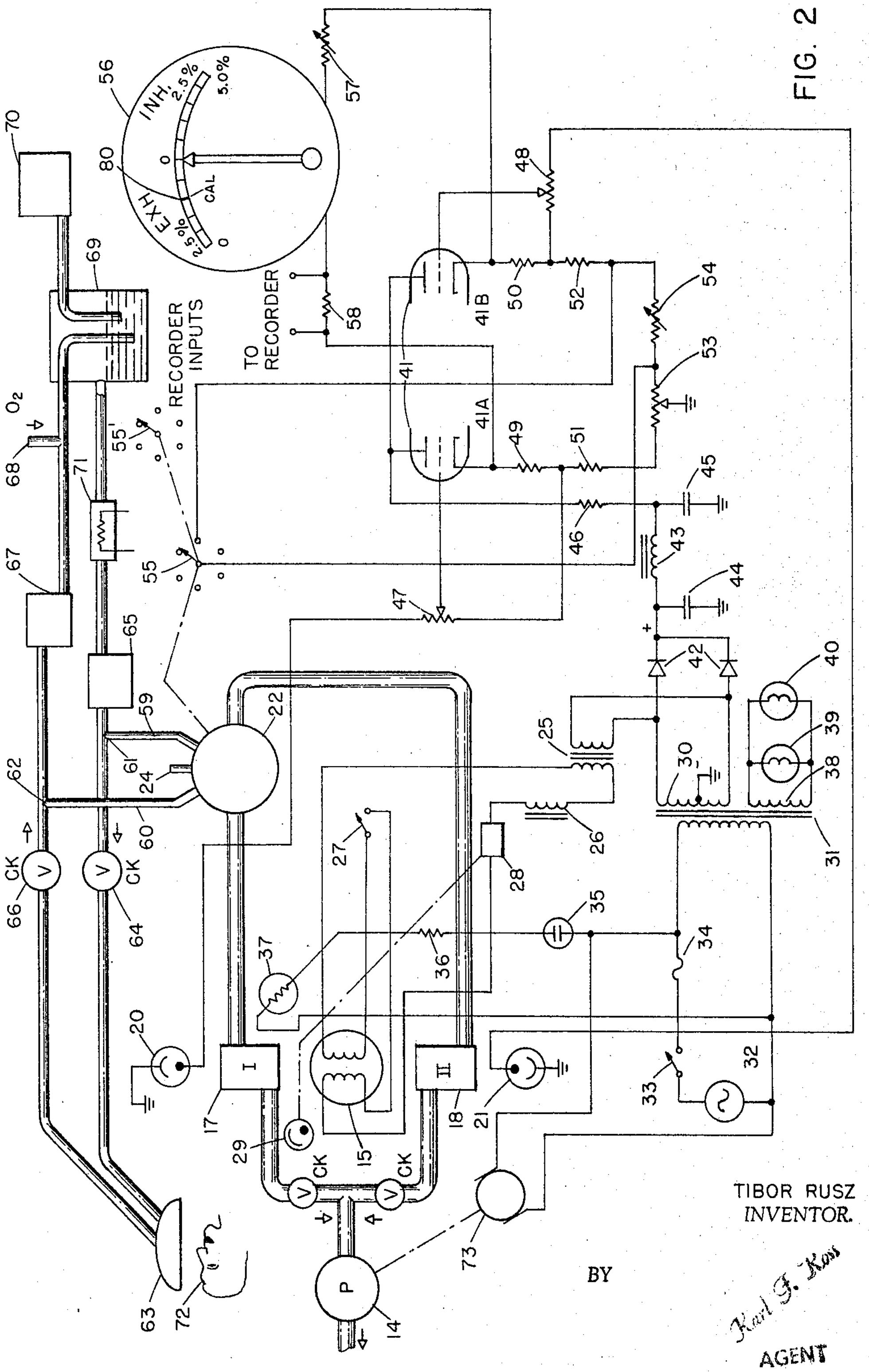
FIG. 2 is a circuit and flow diagram of the system.
Figure 3:
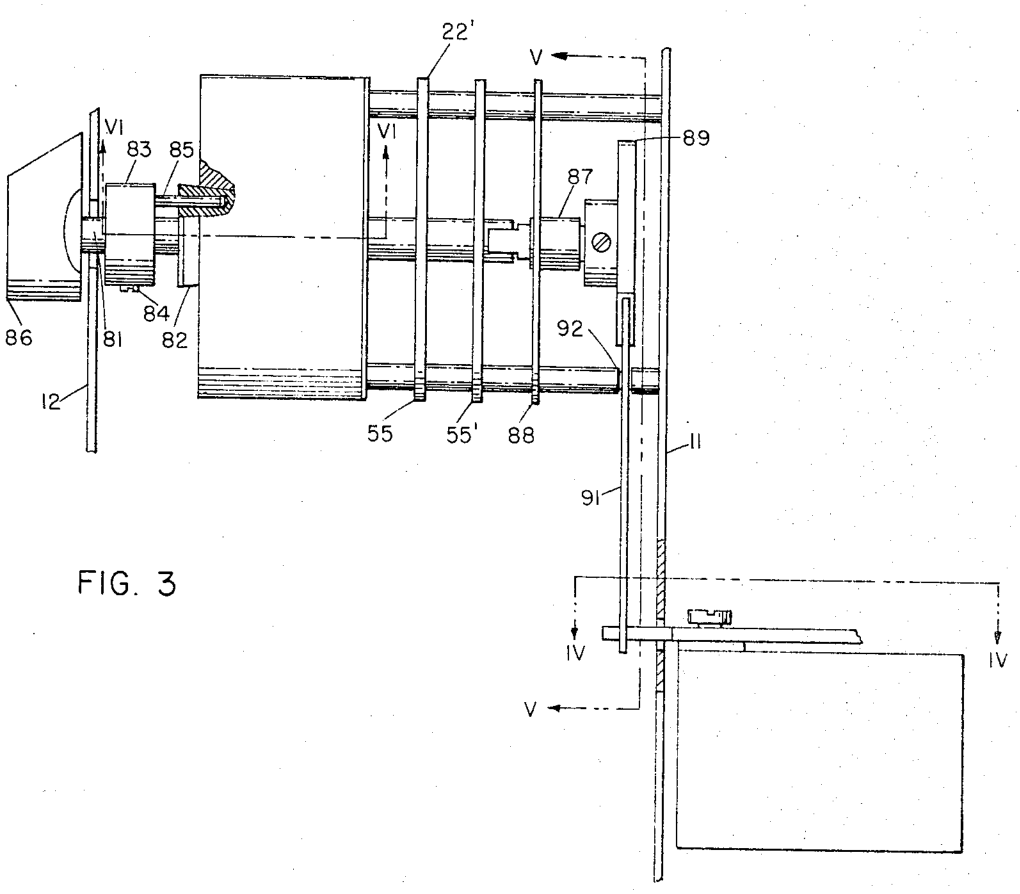
FIG. 3 is a plan view of the control valve of the present invention, illustrating the means connected therewith for operating the calibration screen of the device.
Figure 5:
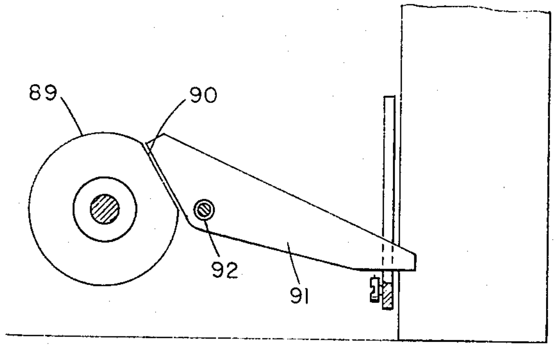
FIG. 5 is a cross-sectional view taken along the line V—V of FIG. 3 illustrating the actuating means for the screen.
Figure 4:
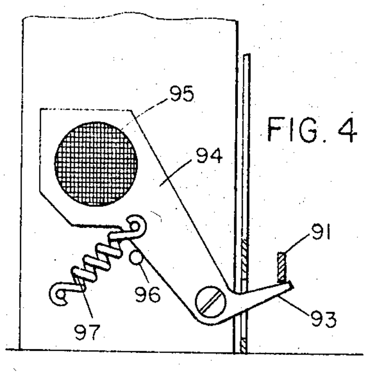
FIG. 4 is a cross-sectional view taken along the line IV—IV of FIG. 3 showing the calibration screen in greater detail.

Referring now to FIG. 2, it may be seen that the UV tube 15 is energized via a transformer 25 and a loading choke 26 in series with a switch 27 mounted upon the panel. An electronic control 28, such as a beam-power pentode, is connected in circuit with the UV tube 15 and energized via a photocell 29 to maintain the output intensity of the tube 15 substantially constant. This is important inasmuch as UV tubes of the mercury-vapor type show an appreciable loss in intensity even during a relatively short period of use so that the photocell 29 and the control 28 constitute compensating means for maintaining a substantially constant output amplitude.

Transformer 25 is connected across the secondary winding 30 of a power transformer 31, the center tap of this secondary winding being grounded. Power transformer 31 is bridged across the line 32 in series with a switch 33 mounted upon the instrument panel and a fuse 34. A neon pilot lamp 35 in series with a loading resistor 36 and a photoconductor 37 is likewise connected across the line 32 in series with fuse 34. Thus, when switch 33 is closed switch 27 can be closed to energize UV lamp 15. If the output intensity of this lamp is insufficient, photoconductor 37 remains highly resistive so that pilot lamp 35 is in an extinguished condition. Lamp 35 thus provides an indication as to possible failure of the UV source. Once tube 15 emits ultraviolet radiation, photocell 29 responds to maintain substantially constant light output until the tube 15 fails. Another secondary winding 38 energizes a further pilot lamp 39 which is illuminated upon closure of switch 33 to indicate to the operator that switch 27 may be closed. The filament 40 of a double-triode vacuum tube 41 is also supplied via secondary winding 38.

Rectifiers 42 form a full-wave rectification network connected across secondary winding 30 and feed a smoothing filter consisting of a choke 43 and a pair of capacitors 44, 45 connected between the positive terminal of the rectifying network and ground. Resistor 46 is provided between the filter and the plates of double triode 41 which is connected to amplify the current within a bridge circuit across which the outputs of photocells 20, 21 are connected. The latter constitute photoelectric means responsive to the intensity of the radiation transmitted through the gases within sampling cells 17, 18 and may be of the photo-multiplier, photo-emissive or photo-conductive type. As illustrated in FIG. 2, the output terminals of photocells 20, 21 are connected between ground and the respective grids of triode sections **41*a*, 41*b* via potentiometers 47, 48 across which the grid bias is developed. The cathodes of the triodes are provided with cathode-bias resistors 49, 50, while a bridge circuit consisting of resistors 51, 52 and a balancing resistor 53 is provided across which the cathodes are connected. A compensating variable resistor 54 can be connected in series with this bridge via a switch 55 whose function will be described below. This switch is mechanically coupled with valve 22 for operation jointly therewith. The cathodes of the triodes 41*a*, 41*b* are bridged by an indicating circuit comprising a galvanometer 56, whose face is provided with indicia enabling a direct reading of the concentraton of the gas in cells 17, 18 and, consequently, that supplied to the depleting station. An adjustable resistor 57 is connected in series with the meter 56 to provide a fine adjustment of the zero setting thereof while a further resistor 58 is connected in series with the meter 56** so that its voltage drop can be used to operate a strip or disk recorder if desired.

The input lines 59, 60 can be connected to the inhalation and exhalation conduits 61, 62, respectively, of an anaesthesia system of the type shown in my copending application Ser. No. 270,083, filed April 2, 1963, now Patent Number 3,251,361. Only the basic features of this system are illustrated herein although it should be noted that the entire system may be used for the practice of this invention and that other conventional systems (i.e. of the noncirculating type) may be employed. The inhalation line 61 supplies the face mask 63 via a check valve 64 and may have the usual respiration-indicating means 65 therein. Exhaled gases pass through the check valve 66 of the exhalation line and thence through an absorber 67 in which excessive carbon dioxide and moisture can be removed. Oxygen is then added to the circulating gas at 68, this gas passing into a reduced-temperature vessel 69, which, in accordance with the principles advanced in my above-identified copending application, is maintained at a temperature at which the circulating gas will be saturated with the anaesthetic at the concentration of this anaesthetic desired in the inhalation stream. To facilitate such saturation, the circulating exhaled gases, to which oxygen has been added and from which contaminants have been removed, is passed into intimate relationship with the liquid anaesthetic at reduced temperature, additional quantities of the anaethetic liquid being supplied from reservoir 70. From the saturating vessel 69, the effluent gas passes through a heater 71 in which it is raised to a temperature suitable for administration to the patient 72. The heating means may, of course, include a heat exchanger in which sensible heat of the exhaled gas is used to raise the temperature of the inhaled stream or a conduit simply passing through the hospital room which is maintained at a temperature above that of vessel 69.

In operation, the individual monitoring the administration of the anaesthetic connects lines 59 and 60 to the inhalant and exhalant tubes 61, 62, respectively, and turns on switches 33 and 27. The motor 73 of pump 14 is thus started and the entire unit placed in operation. In one position of valve 22, line 59 is connected with sampling cell 17 (I) while filtered air stream inlet 24 is supplied to cell 18 (II), the halothane-containing gas and the gas free from halothane being evacuated by pump 14 at a constant rate. The ultraviolet radiation passed by cell 17 is thus less than that transmitted through cell 18 and photocell 20 reacts to a lesser extent than photocell 21. A current-flow is thus developed between the cathodes of triodes **41*a* and 41*b* to deflect the needle of meter 56 in a clockwise direction from its zero position on the lower scale. A direct reading of the halothane concentration in the inhalant line is thus provided. When it is desired to obtain a reading of the halothane concentration in the exhalant line, valve 22 is shifted to direct a stream of air into, say, cell I while a portion of the exhalant stream is admitted to cell II, the triodes again detecting the imbalance and providing an indication on meter 56. When the valve is arranged in this manner, it is desirable to have switch 55 so arranged that the potential across the meter 56** is switched and the needle then rises from a zero indication on the lower scale at its right-hand end. It has been found convenient, however, to carry out sampling of a single gas stream containing the absorbent gas in just one of the cells so that, in the second position of the valve mentioned, the exhalant stream will be fed to cell I while air is supplied to cell II. In this case no switchover of the meter is required. It is a feature of this invention, however, to provide means for alternating the function of these cells so that an error in sensing the absorption of the gas and deriving from a physical obstruction in one of the cells, an electrical phenomenon in one of the photoelectric devices or an amplification phenomenon in one half of the system will not be manifested in compounded errors.

In a further position of valve 22, a portion of the inhalant stream is supplied to cell I while a portion of the exhalant stream is supplied to cell II and switch 55 opens to connect variable resistor 54 in the detection circuit. In this case the amplifier 41 etc. responds to a difference in the optical absorption in cells I and II so that the current supplied to meter 56 passes in one or another direction, depending upon the dominant absorption. Meter 56, whose needle is at the central zero position (upper scale) when resistor 54 is in circuit, thus provides an indication as to the quantity of anaesthetic abstracted by the patient from the anaethesia stream or supplied by him to the exhalant. It must be mentioned at this point that the latter quantity is, of course, the most essential in governing the administration of anaesthesia, the difference in anaesthesia concentration between the inlet and outlet values being a direct indication of net absorption or release of the anaesthetic.

When calibration of the device is necessary, valve 22 is shifted into a position in which air free from a UV-absorbing constituent is drawn through both cells simultaneously. Switch 55 is then closed and a standard screen, mechanically coupled with the valve by means to be described hereinafter, having a known coefficient of UV absorption is introduced between photocells 20 and the UV source 15. The needle then swings clockwise and potentiometer 53 and/or potentiometers 47, 50 and 57 are adjusted until this needle is in line with the calibration mark 80 of the meter. When it is desired to set the zero reading of the device, valve 22 can be shifted into another position in which air, a gas having a known concentration of the sensitive constituent, namely zero, passes through both cells and wherein switch 55 is open, variable resistors 54 and 57 being then adjusted to bring the needle of the meter into line with the zero indication of the upper scale. Another position may be provided, if desired, in which switch 55 is closed, in which case potentiometer 57 is adjusted to align the needle with the zero indication at the left-hand end of the lower scale.

The valve and switch arrangement illustrated in FIGS. 3–10 is shown to be mounted within chamber 13 along the inner face of support plate 11 between the latter and the panel 12, the valve of FIG. 1 being shown on the opposite side of plate 11 for purposes of illustration. The valve 22′ comprises an actuating shaft 81 freely rotatable within the valve plug 82 but having a bushing 83 locked to the shaft by a screw 84 for engaging this plug 82 by the pin 85. Shaft 81 carries a control knob 86 and the movable members of wafer switches 55, 55′. In addition, In addition, this shaft 51 is affixed to a stud 87 journaled in a plate 88 of the switch structure and carrying a cam 89 best seen in FIGS. 3 and 5. As will be evident from the latter figure, this cam has the configuration of a circular disk with a flat 90 extending approximately over one-sixth of the circumference of the disk at an angular location corresponding to the "calibrate" position of the valve and switch. A lever 91 is pivotally mounted upon plate 11 and has its fulcrum at 92 so that it is normally cammed in a clockwise direction by the circular portion of disk 89 and bears downwardly upon an extremity 93 of a further lever 94 carrying the calibrating screen 95 and biased against the stop 96 by a spring 97 in a direction opposite the effective direction of lever 91. Thus, screen 95 is normally held out of alignment, in its guide bracket 98 (FIG. 1), with the ultraviolet lamp 15 and cell 20. When, however, the valve 22 is in its "calibrating" position, lever 91 moves counterclockwise into the position illustrated in FIG. 5 whereupon lever 94 shifts lever 91 by the action of spring 97 and interposes its screen 95 in the path of the UV beam. When the valve is rotated out of the calibrating position, however, lever 91 is again cammed in the clockwise sense to lift screen 95 out of the path of the UV beam.

FIGS. 6–10 show the multi-position distributing valve in greater detail. The valve body 100 has a press-fitted valve seat 101 in which plug 82 is rotatable, plug 82 having a pair of axially extending grooves 102, 103 along diametrically opposite portions of the plug periphery. Grooves 102, 103 are represented in broken lines in FIG. 10 which shows, in developed form, the configuration of the peripheral grooves of valve seat 101. The latter is formed with a pair of annular grooves 104, 105, permanently connected, respectively, with sampling cells I, II via radial bores 106, 107 (FIGS. 8 and 9). Another radial bore 110 admits air via filter 24 to the valve while radial bores 111 and 112 form part of the inhalant and exhalant lines 59, 60, respectively. A meandering groove 108 forms the air path while grooves 109′, 109″ form inlet portions for the anaesthetic fluid. Referring now to FIG. 10 is may be seen that displacement of plug 82 in the clockwise sense through positions corresponding to positions 1–5 of the developed view provides the following valve modes:

Position 1 corresponds to the calibrate position wherein grooves 102, 103 communicate between the air groove 108 and the respective outlet grooves 104, 105 to feed air to both sampling cells. In this position the disk 89 (FIG. 5) is in the position illustrated so that screen 95 is interposed between the UV source and the photocell. When plug 82 is rotated clockwise to position 2, grooves 102, 103 maintain air flow to the respective cells while the disk 89 removes screen 95 from the path of the UF beam. Position 2 thus corresponds to the "zero position" of the device. In the "inhalant" position 3, groove 102 connects its outlet 104 with the inhalant groove 109′ while groove 103 continues to direct air into sample chamber II. A determination of the concentration of halothane in the inhalant line can then be read directly from the meter. In position 4 or the "differential" position, groove 102 communicates between grooves 109′ and 104 while groove 103 communicates between grooves 109″ and 105 to supply inhalant and exhalant gases to cells I and II, respectively. In the final position 5 ("exhalant" position) groove 102 communicates with air groove 108 while groove 103 is supplied with exhalant gases via groove 109″, meter 56 then yielding a direct indication of the concentration of halothane in the exhaled gases. Switch 55′ may be ganged to switch 55 for cutting in a plurality of recording inputs of, for example, a multipoint recorder and connecting these inputs successively across resistor 58. It is thus possible to obtain a printed record of the individual anaesthetic concentration in the inhalant and exhalant stream in addition to a reading of the differential concentration. Valve 22 along with switch 55′ can be operated by a scanning or commutator device for repetition of the analysis cycle. When manually operated, the device need be required to give readings of the inhalant and exhalant concentrations only intermittently and can be left in position 4 to provide a differential reading during the remainder of the time.

In FIGS. 11 and 12 I show another valve of the general type described above. Again the valve body 200 is provided with a press-fitted seat 201 having a meandering air groove 208, inhalant grooves 209a′ and 209b′ and exhalant grooves 209a″ and 209b″. When plug 202 is rotated, its respective grooves 202, 203 again communicate between respective annular grooves connected to cells I and II, respectively, and the grooves of seat 201. The calibrate (position 1), zero (position 2) inhalant (position 3) and differential (position 4) settings of the valve of FIG. 11 are identical with the corresponding positions of the valve of FIGS. 6–10. In position 5, however, groove 202 communicates between exhalant groove 209a″ and cell I while groove 203 connects the inhalant groove 209b″ to cell II, thus reversing the connection of the sampling cells. In this manner, it is possible to determine whether the reading given by meter 56 is a true indication of the differential concentration or a peculiarity of the instrument. In position 6, groove 202 again connects the exhalant line with cell I while groove 203 supplies air to cell II. A reading is thus obtained of the concentration of anaesthesia in the exhalant line, cell I being employed for the reading of both individual concentrations to obviate multiplication of error.

The invention as described and illustrated is believed to admit of many modifications and variations within the ability of persons skilled in the art, all such modifications and variations being deemed to be included within the spirit and scope of the appended claims.

What is claimed is:

1. A method of monitoring the quantity of an anaesthetic having a characteristic absorption of ultraviolet radiation supplied to a patient adapted to alter the concentration of said anaesthetic by the withdrawal and introduction thereof into a gas stream, comprising the steps of supplying an inhalant gas stream containing said anaesthetic to said patient and removing an exhalant gas stream therefrom; intermittently sensing the concentration of said anaesthetic in each of the inhalant and exhalant gas streams by intermittently passing ultraviolet radiation to which said anaesthetic is sensitive through at least a portion of each of said gas streams; converting the intensity of the ultraviolet radiation transmitted by each of said portions of said gas streams into electrical signals whose magnitudes are respectively proportional to the concentrations of said anaesthetic in said gas streams; selectively providing a visual indication of each of the resulting signal; intermittently passing said ultraviolet radiation simultaneously through both of said portions of said gas streams; differentially combining simultaneously derived electrical signals whose magnitudes are respectively proportional to the concentrations of said anaesthetic in said gas streams; and providing a visual indication of the differentially combined signals.

2. An apparatus for monitoring the quantity of a constituent having a characteristic absorption of electromagnetic radiation at a station adapted to alter the concentration of said constituent, comprising a source of said electromagnetic radiation; a pair of sampling cells transparent to said radiation and aligned with said source for passing said radiation through respective gas samples in said cells; conduit means connected with said cells for supplying respective gas samples thereto, at least one of said gas samples containing said constituent; photoelectric means individual to said cells for converting the radiation transmitted therethrough to an electrical signal whose magnitude is proportional to the concentration of said constituent in the respective sample; circuit means for differentially combining the signals produced by said photoelectric means; read-out means for providing a visual indication of the differentially combined signals; and multiposition valve means having a first position for delivering a sample of the gas containing said constituent supplied to said station to one of said cells and a sample of the gas withdrawn from said station and containing said constituent to the other of said cells, a second position for delivering gas containing said constituent and supplied to said station to one of the cells and a reference gas having a known concentration of said constituent to the other cell, and a third position for delivering gas withdrawn from said station and containing said constituent to one of said cells and a reference gas with a known concentration of said constituent to the other cell.

3. An apparatus for monitoring the quantity of a constituent having a characteristic absorption of electromagnetic radiation at a station adapted to alter the concentration of said constituent, comprising a source of said electromagnetic radiation, a pair of sampling cells transparent to said radiation and aligned with said source for passing said radiation through respective gas samples in said cells, conduit means connected with said cells for supplying respective gas samples thereto, at least one of said gas samples containing said constituent; photoelectric means individual to said cells for converting the radiation transmitted therethrough to an electrical signal whose magnitude is proportional to the concentration of said constituent in the respective sample; circuit means for differentially combining the signals produced by said photoelectric means; and read-out means for providing a visual indication of the differentially combined signals, said station being provided with an inlet and an outlet conveying respective gas streams containing said constituent thereto, said conduit means comprising valve means for selectively diverting at least a portion of each of said gas streams to one of said cells, said valve means comprising means for passing a gas having a known concentration of said constituent through one of said cells while the other of said cells is supplied with one of said portions, said valve means being constituted as a multiposition valve having a first position wherein said portion of the inlet gas stream is connected to one of said cells while said stream having a known concentration of said constituent is supplied to the other cell; a second position wherein one of said portions is supplied to one of said cells and the other portion is supplied to the remaining cell; and a third position wherein said portion of the outlet gas stream is supplied to one of said cells while said stream having a known concentration of said constituent is supplied to the other cell, said read-out means comprising a meter having at least two scales, said circuit means including compensating means for shifting the range of said meter, said apparatus further comprising switch means coupled with said valve for selectively connecting said compensating means in circuit with said meter and removing it from circuit therewith upon shifting of said valve between said positions.

4. An apparatus as defined in claim 3 wherein said valve has a further position in which said stream having a known concentration of said constituent is supplied to both of said cells, further comprising calibrating means connected with said valve for insertion into a path of the electromagnetic radiation impinging upon one of said photoelectric means in said further position of said valve for enabling adjustment of the reading of said meter.

5. An apparatus as defined in claim 3 wherein said circuit means includes respective amplifier means connected with each of said photoelectric means.

6. An apparatus as defined in claim 3, further comprising means responsive to the intensity of said electromagnetic radiation for maintaining the output of said source substantially constant.

References Cited by the Examiner

UNITED STATES PATENTS

| | | | |
|---|---|---|---|
| 2,720,594 | 10/1955 | Hutchins | 250—43.5 |
| 2,878,388 | 3/1959 | Bergson | 250—43.5 |
| 3,005,097 | 10/1961 | Hummel | 250—43.5 |
| 3,166,676 | 1/1965 | Robinson | 250—43.5 |
| 3,180,990 | 4/1965 | Randall et al. | 250—43.5 |

RALPH G. NILSON, *Primary Examiner.*

A. L. BIRCH, *Assistant Examiner.*